UNITED STATES PATENT OFFICE.

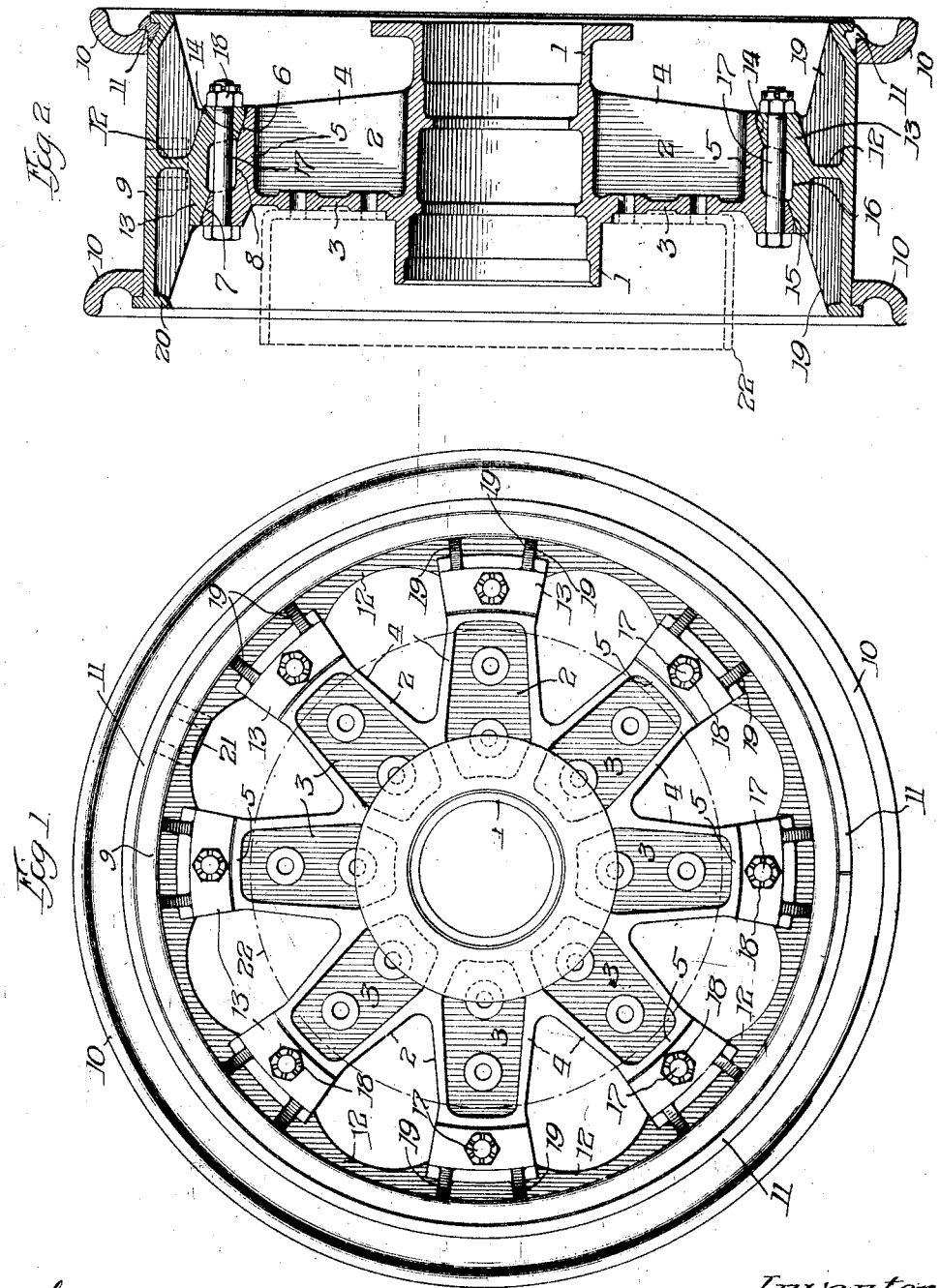

ALBERT HARGRAVES, OF AKRON, OHIO, ASSIGNOR TO THE FIRESTONE STEEL PRODUCTS COMPANY, OF AKRON, OHIO, A CORPORATION OF OHIO.

CAST-STEEL WHEEL.

1,331,917.  Specification of Letters Patent.  Patented Feb. 24, 1920.

Application filed July 16, 1918. Serial No. 245,221.

*To all whom it may concern:*

Be it known that I, ALBERT HARGRAVES, a subject of the King of Great Britain, residing at Akron, in the county of Summit and State of Ohio, have invented certain new and useful Improvements in Cast-Steel Wheels, of which the following is a specification.

It is the object of this invention to construct a wheel of cast steel or other suitable material, which shall be strong, durable and easily manufactured and which may be used to replace wooden wheels for use in heavy truck service, and which is designed to carry a demountable rim adapted to carry a pneumatic tire. Although designed particularly for use on heavy trucks or for like duty, it is not limited to such work, but may be used wherever found desirable.

In the drawings accompanying this application there is shown one form of the device, which is susceptible of modification.

Figure 1 is a side elevation.

Fig. 2 is a cross section.

The wheel structure comprises a hub 1 from which radiate integral spokes 2, the rear surfaces 3 of which are arranged in the plane of rotation of the wheel with side flanges as shown at 4. The ends of the spokes are closed by bearing surfaces 5, the outer surfaces of which are formed with a conical bearing surface 6 nearest the outside of the wheel and with a second conical bearing surface 7 in the inside of the wheel. The two surfaces are parallel, but the inner surface is formed outside of the line of the surface 6. Between the surfaces 6 and 7 the ends of the spokes are formed with cylindrical surfaces 8.

The wheel is designed to be used in combination with a demountable rim of the design shown herein. The rim is preferably of the integral base type and is shown at 9. The upper surface of the rim may be of any desired contour, that shown being of a well known quick detachable straight side type with removable flanges 10 and a locking ring 11. The base of the rim is formed with a central inwardly projecting rib 12 which is arched to meet a series of bases or feet 13, equal in number to the number of spokes on the wheel and designed to rest on them. The bases are formed with inclined surfaces 14 and 15 corresponding in inclination to and designed to bear on the ends of the spokes, the surface 14 on the surface 6 and the surface 15 on the surface 7. Between the two inclined surfaces is a cylindrical surface 16. A bolt 17 is passed through the high part of each spoke end and each base or foot on the rim and is designed to carry a castellated nut 18 by which the rim may be drawn in close wedging contact with the wheel. It will be seen that the inner and outer complementary wedging surfaces are formed in different planes so that sufficient metal is provided to properly seat the head and tail ends of the bolts. From each foot there extend transverse ribs or webs 19 which serve to support the rim and transmit the load to the bases. There are shown two of these webs at each base but this number may be changed if found desirable. Around the inside edge of the rim is formed a circumferential strengthening bead 20. At any suitable point on the rim is placed a valve hole 21 and if the wheel is designed to be used as the rear wheel of the truck, a brake drum 22 may be secured to it as shown in dotted lines.

The structure of the wheel is susceptible of alteration to meet the exigencies of service in which it may be placed and may be modified without departing from the spirit of the invention, or sacrificing any of its benefits.

I claim:

1. In a wheel structure, a hub, spokes radiating therefrom, the spoke ends being formed with inclined bearing surfaces, a rim, a central rib on the inside of said rim, bases extending inwardly from the rib, inclined bearing surfaces on the inside of said bases, and transverse strengthening webs extending from the bases to the rim and extending from the rib to the edges of the rim.

2. In a wheel structure, a hub, spokes radiating therefrom, the ends of said spokes being formed with bearing surfaces, a rim, a central circumferential rib and bases extending inwardly from the rim, bearing surfaces on the inside of said bases, and transverse strengthening webs extending from the bases to the rim.

3. In a wheel structure, a hub, spokes radiating from the hub, inclined bearing surfaces on the spoke ends, a rim, a circumferential web on the inside of the rim, a series of bases formed with the rib, transverse strengthening webs extending from the bases to the rim and extending from the rib to the edges of the rim, inclined bearing surfaces on the under side of said bases, and means to hold said bases on the spoke ends.

4. In a wheel structure, a hub, spokes radiating from the hub, each spoke end being formed with two inclined bearing surfaces, the inner of said bearing surface being outside of the line of the outer of said bearing surfaces, a demountable rim, a circumferential rib on the under side of said rim, bases formed on said rib, inclined bearing surfaces on the said bases corresponding to the inclined bearing surfaces on the spoke ends, strengthening webs extending from the bases to the rim, and means to hold the rim on the wheel with the bearing surfaces in contact.

ALBERT HARGRAVES.